(12) United States Patent
Ferreira et al.

(10) Patent No.: US 12,195,194 B2
(45) Date of Patent: Jan. 14, 2025

(54) AIRCRAFT PROPULSION SYSTEM HAVING A NACELLE EQUIPPED WITH AN IMPROVED ARTICULATION SYSTEM

(71) Applicant: Airbus Operations SAS, Toulouse (FR)

(72) Inventors: Julien Ferreira, Toulouse (FR); Rémy Weill, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/408,127

(22) Filed: Jan. 9, 2024

(65) Prior Publication Data
US 2024/0228051 A1    Jul. 11, 2024

(30) Foreign Application Priority Data
Jan. 11, 2023    (FR) ........................................ 2300273

(51) Int. Cl.
*B64D 29/06*    (2006.01)
*F01D 25/24*    (2006.01)
*F01D 25/28*    (2006.01)

(52) U.S. Cl.
CPC ............ B64D 29/06 (2013.01); F01D 25/24 (2013.01); F01D 25/28 (2013.01); *F05D 2220/36* (2013.01); *F05D 2260/30* (2013.01)

(58) Field of Classification Search
CPC ........... F02K 1/80; B64D 29/06; B64D 29/08; F05D 2260/30
See application file for complete search history.

(56) References Cited

U.S. PATENT DOCUMENTS

| 8,002,217 | B2 * | 8/2011 | Sternberger | F02K 1/70 |
| | | | | 239/265.29 |
| 2014/0334922 | A1 | 11/2014 | Fabre et al. | |
| 2015/0369083 | A1 * | 12/2015 | Mercier | F01D 25/28 |
| | | | | 415/214.1 |
| 2016/0340024 | A1 | 11/2016 | Pautis et al. | |
| 2018/0362172 | A1 * | 12/2018 | Paolini | B64D 27/40 |
| 2020/0070992 | A1 | 3/2020 | Theron et al. | |

FOREIGN PATENT DOCUMENTS

| EP | 3095706 A1 | 11/2016 |
| FR | 3005453 A1 | 11/2014 |
| FR | 3053026 A1 | 12/2017 |
| FR | 3085351 A1 | 3/2020 |

OTHER PUBLICATIONS

French Search Report for corresponding French Patent Application No. 2300273 dated Jun. 28, 2023.

* cited by examiner

Primary Examiner — Woody A Lee, Jr.
Assistant Examiner — Maxime M Adjagbe
(74) Attorney, Agent, or Firm — Greer, Burns & Crain, Ltd.

(57) ABSTRACT

A propulsion system having a chassis, two fan cowls and, for each one, an articulation system fastened between the chassis and the fan cowl, so as to move the fan cowl between a closed position and an open position and a locking device like a clamping screw, wherein each articulation system has, for each fan cowl, two pantograph hinges. With such an arrangement, each fan cowl moves away laterally as soon as its opening starts.

8 Claims, 3 Drawing Sheets

AIRCRAFT PROPULSION SYSTEM HAVING A NACELLE EQUIPPED WITH AN IMPROVED ARTICULATION SYSTEM

CROSS-REFERENCES TO RELATED APPLICATIONS

This application claims the benefit of French Patent Application Number 2300273 filed on Jan. 11, 2023, the entire disclosure of which is incorporated herein by way of reference.

FIELD OF THE INVENTION

The present invention relates to an aircraft propulsion system having a chassis, a nacelle with two fan cowls and, for each one, an articulation system mounted on the chassis so as to articulate the fan cowl. The invention also relates to an aircraft having such a propulsion system.

BACKGROUND OF THE INVENTION

An aircraft has a fuselage to each side of which is fastened a wing. Beneath each wing is suspended at least one propulsion system such as a turbofan. Each propulsion system has a chassis, a core that constitutes the engine and a nacelle that surrounds the core, wherein the core and the nacelle are fastened to the chassis.

The propulsion system is fastened beneath the wing by way of a pylon that is fastened between the structure of the wing and the chassis.

The nacelle has, inter alia, cowls mounted on the chassis and, in the case of a turbofan, the nacelle has, from the front to the rear, an air inlet cowl, two fan cowls and rear cowls. The air inlet cowl delimits the inlet of the nacelle through which the air that supplies the core is introduced. The fan cowls surround a fan that draws in air from the inlet of the nacelle so as to send it towards the core. The rear cowls cover the rear of the core as far as the exhaust nozzle.

The two fan cowls are mounted articulated on the chassis via hinges of which the axes are generally parallel to the longitudinal axis of the propulsion system.

Although such an arrangement is satisfactory, interactions may occur between the two fan cowls when they are opened simultaneously.

It is therefore necessary to find an arrangement that makes it possible to prevent, inter alia, these interactions.

SUMMARY OF THE INVENTION

An object of the present invention is to propose an aircraft propulsion system having a chassis, a nacelle with two fan cowls and, for each one, an articulation system mounted on the chassis so as to articulate the fan cowl, wherein the articulation system has two pantograph hinges.

To that end, a propulsion system for an aircraft is proposed, said propulsion system having a longitudinal axis and having:
 a chassis,
 a nacelle having two fan cowls,
 for each fan cowl, an articulation system fastened between the chassis and said fan cowl, so as to move said fan cowl between a closed position and an open position and vice versa, and
 for each fan cowl, a locking means arranged to alternately adopt a locked position in which it locks said fan cowl on the chassis in the closed position and an unlocked position in which it does not lock said fan cowl on the chassis,
 wherein each articulation system has, for each fan cowl, two pantograph hinges.

With such an arrangement, each fan cowl moves away laterally as soon as its opening starts, and this makes it possible to separate the two fan cowls and limits the risk of interactions. In addition, such an arrangement also makes it possible to save weight compared with hinges of the prior art.

Advantageously, the chassis is constituted by a fan casing of the propulsion system.

Advantageously, each pantograph hinge has:
 a support fastened to the chassis,
 a fitting as one with the fan cowl,
 a first arm of which a first end is mounted articulated on the support at a first articulation and of which a second end is mounted articulated on the fitting at a second articulation,
 an elbow mounted articulated on the support at a third articulation and a second arm of which a first end is mounted articulated on the elbow at a fourth articulation and of which a second end is mounted articulated on the fitting at a fifth articulation, and
 a connecting arm of which a first end is fastened to the first arm on the other side of the first articulation with respect to the second articulation and of which a second end is fastened to the elbow on the other side of the third articulation with respect to the fourth articulation.

Advantageously, each articulation is a rotation about an axis of rotation parallel to the longitudinal axis.

Advantageously, for two pantograph hinges fastened to two different fan cowls, the first arms of the pantograph hinges are disposed next to one another, and the second arms of the pantograph hinges are disposed opposite one another.

Advantageously, the locking means is constituted of clamping screws that lock said fan cowl on the chassis in the closed position.

Advantageously, each fan cowl has a skin and a rigid structure to which the outer skin is fastened and the pantograph hinges are fastened to the rigid structure.

Advantageously, the propulsion system has, for each fan cowl, at least one holding arm, of which a first end is fastened to the chassis and of which a second end is fastened to the fan cowl.

The invention also proposes an aircraft having an engine and a propulsion system according to one of the preceding variants, wherein the engine is as one with the chassis and housed inside the nacelle.

BRIEF DESCRIPTION OF THE DRAWINGS

The abovementioned features of the invention, along with others, will become more clearly apparent upon reading the following description of one exemplary embodiment, said description being given with reference to the appended drawings, in which.

DETAILED DESCRIPTION OF THE PREFERRED EMBODIMENTS

Figure 1:
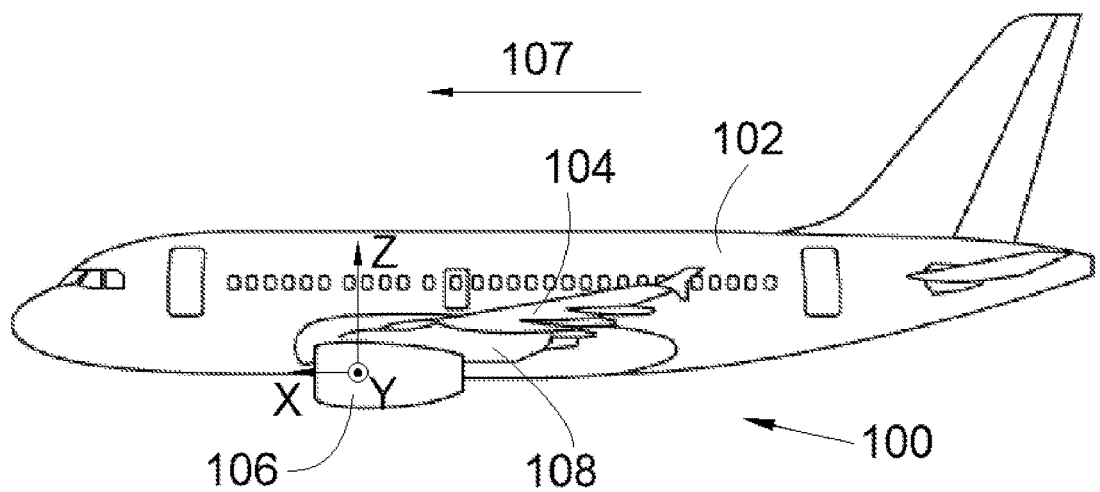
FIG. 1 is a side view of an aircraft according to the invention.

In the following description, terms relating to a position are considered in relation to an aircraft in a position of forward movement as shown in FIG. 1.

FIG. 1 shows an aircraft 100 that has a fuselage 102 to each side of which is fastened a wing 104 that bears at least one propulsion system 106 such as a turbofan that is fastened beneath the wing 104 by way of a pylon 108.

Figure 2:
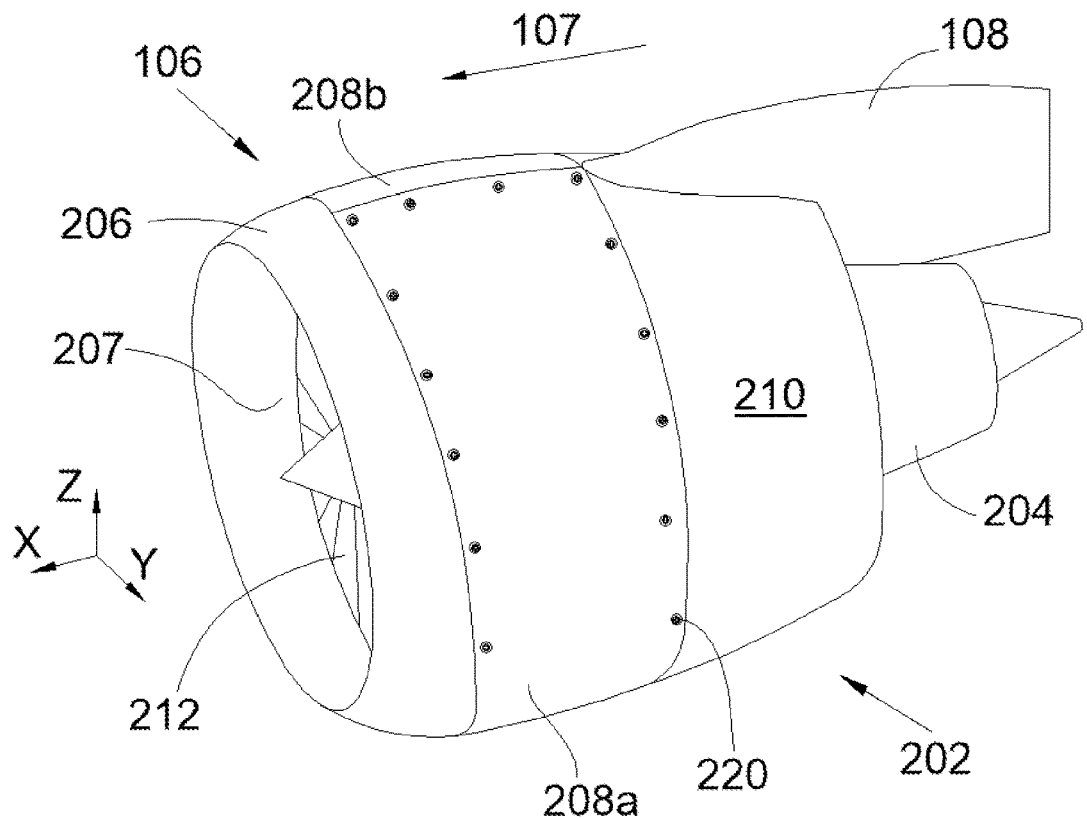
FIG. 2 is a perspective view of a propulsion system according to the invention.

FIG. 2 shows the propulsion system 106 that has a nacelle 202 and a core constituting the engine 204 and housed inside the nacelle 202. The propulsion system 106 also has a chassis (402, FIG. 4) to which are fastened, inter alia, the engine 204 and the nacelle 202. The engine 204 is represented here by the exhaust nozzle.

In the following description, and by convention, X denotes the longitudinal axis of the nacelle 202, which corresponds to the longitudinal axis of the propulsion system 106 and which is parallel to the longitudinal axis of the aircraft 100, with positive orientation in this case in the direction of forward movement of the aircraft 100, Y denotes the horizontal transverse axis when the aircraft 100 is on the ground, and Z denotes the vertical axis when the aircraft 100 is on the ground, these three directions X, Y and Z being mutually orthogonal.

The arrow 107 shows the direction of forward travel of the aircraft 100 when the propulsion systems 106 are in operation. The nacelle 202 also has a median plane XZ that is vertical and passes through the longitudinal axis X.

The nacelle 202 has, from the front to the rear, an air inlet cowl 206 that surrounds the air inlet 207, on either side of the median plane XZ, two fan cowls 208a-b and, to the rear of the fan cowls 208a-b, rear cowls 210 that may be the cowls of the thrust reversers of the propulsion system 106. The air inlet cowls 206 and the rear cowls 210 are fastened to the chassis 402 by any suitable fastening means known to those skilled in the art.

The fan cowls 208 a-b surround a fan 212 that is across the inlet of the nacelle 202 that draws in air from the air inlet 207 so as to send it towards the engine 204.

Each fan cowl 208a-b is mounted articulated on the chassis 402 between a closed position, in which it is closed up around the engine 204, and an open position, in which it is moved away from the engine 204, and vice versa. The open position allows access to the inside of the nacelle 202.

For each fan cowl 208a-b, the propulsion system 106 also has a locking means that is arranged to alternately adopt a locked position in which it locks said fan cowl 208a-b on the chassis 402 in the closed position and an unlocked position in which it does not lock said fan cowl 208a-b on the chassis 402, and the fan cowl 208a-b is then free to move. The passage from the locked position to the unlocked position and vice versa is carried out, for example, by a technician from outside the nacelle 202. The locking means may take the form of a series of clamping screws 220 that are distributed around the perimeter of the fan cowl 208a-b and that are screwed onto the chassis 402 through the fan cowl 208a-b from outside the fan cowl 208a-b.

Figure 3:
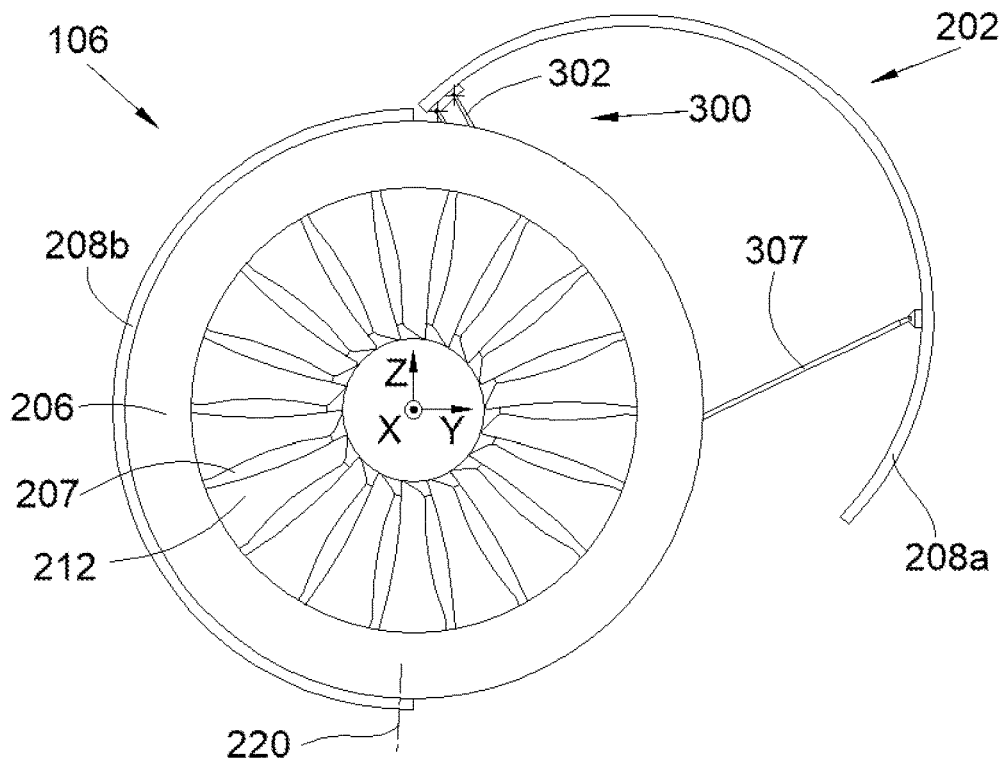
FIG. 3 is a front view of the propulsion system in FIG. 2.

FIG. 3 shows the propulsion system 106 with the fan cowl 208a open, i.e. the one that is on the port side, while the one that is on the starboard side is closed.

To this end, the propulsion system 106 has, for each cowl 208a-b, an articulation system 300 fastened between the chassis 402 and said fan cowl 208a-b, so as to move said fan cowl 208a-b between the closed position and the open position and vice versa.

Figure 4:
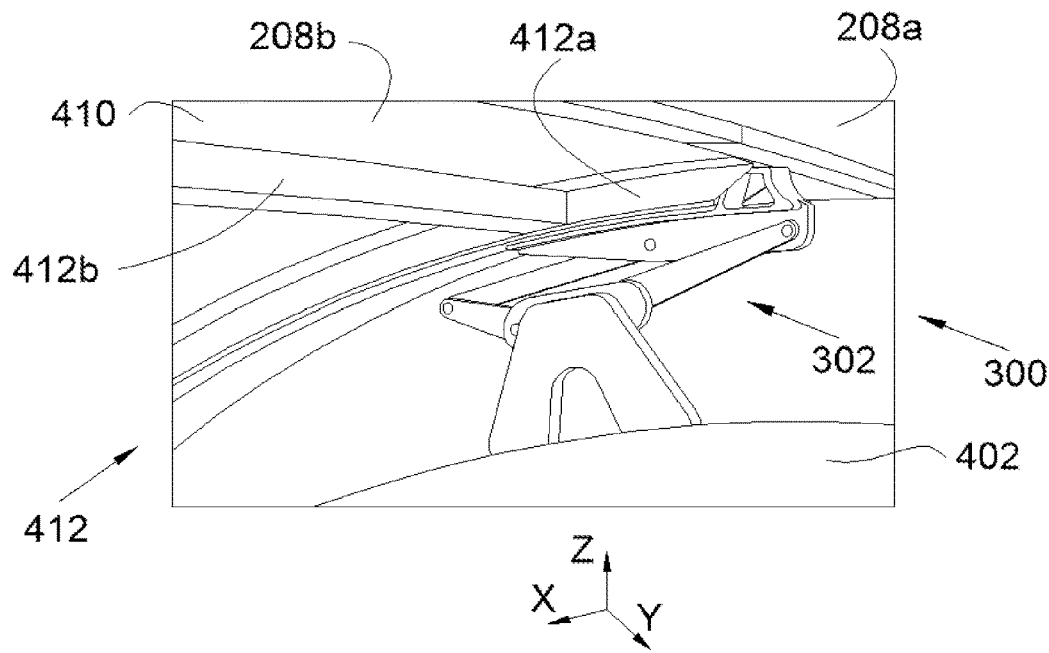
FIG. 4 is a perspective view of the inside of the propulsion system, with the fan cowls in the closed position.

Each articulation system 300 has two pantograph hinges 302 of which one is better seen in FIG. 4, which shows a pantograph hinge 302 of the starboard-side fan cowl 208b.

Each fan cowl 208a-b extends angularly over 180° about the longitudinal axis X with an upper end at 12 o'clock and a lower end at 6 o'clock and the two pantograph hinges 302 of each fan cowl 208a-b are disposed in the vicinity of the upper end at 12 o'clock so as to pass into the open position by raising the fan cowl 208a-b.

With such an arrangement, the upper ends of the fan cowls 208a-b that are contiguous at 12 o'clock move away from one another at the start of the opening, reducing the risk of collision between them.

There is a pantograph hinge 302 at a front part of the fan cowl 208a-b and a pantograph hinge 302 at a rear part of the fan cowl 208a-b along the longitudinal axis X. The two pantograph hinges 302 of one and the same fan cowl 208a-b are identical.

Figure 5:
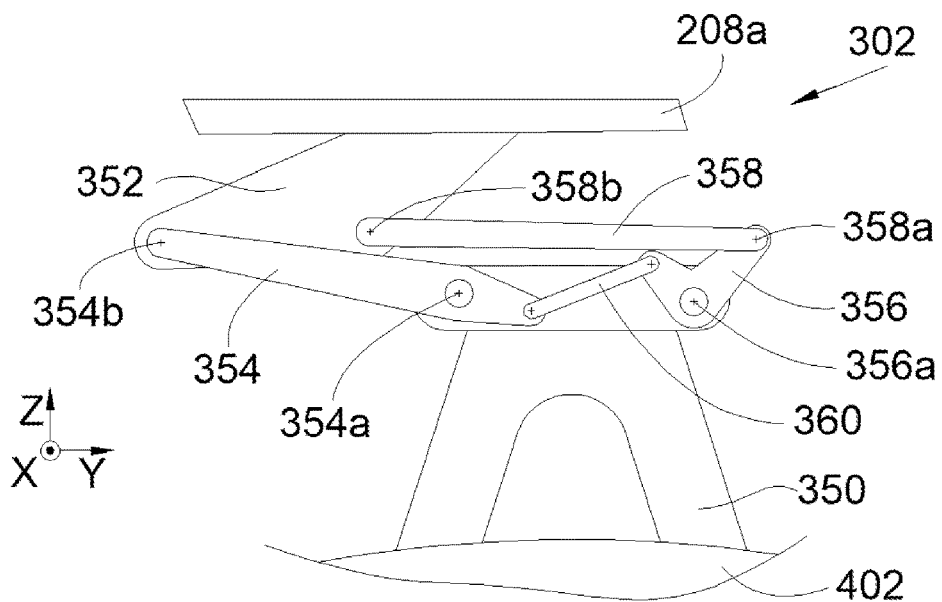
FIG. 5 is a schematic depiction of a pantograph hinge, with the fan cowl in the closed position.
Figure 6:
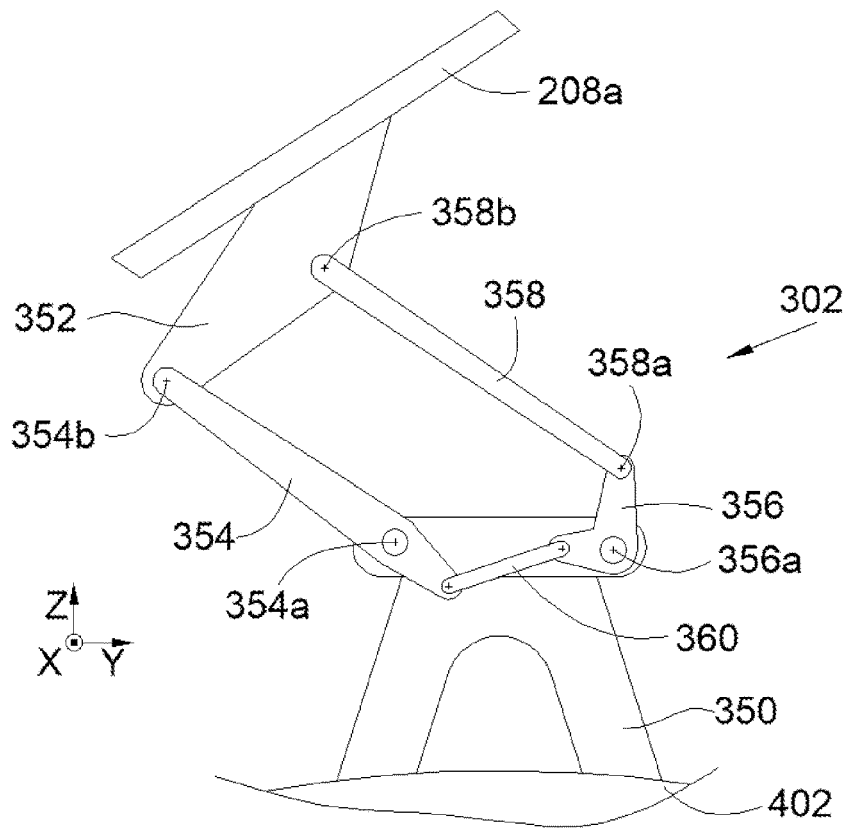
FIG. 6 is a schematic depiction of a pantograph hinge, with the fan cowl in the open position.

FIGS. 5 and 6 show a pantograph hinge 302, respectively with the fan cowl 208a in the closed position and in the open position.

According to one particular embodiment, the chassis 402 is constituted by a fan casing 402 of the propulsion system 106, wherein the fan casing 402 surrounds the fan 212 and is inside the nacelle 202, i.e., the fan cowls 208a-b.

Each pantograph hinge 302 has a support 350 fastened to the chassis 402 and a fitting 352 as one with the fan cowl 208a.

Each pantograph hinge 302 also has a first arm 354 of which a first end is mounted articulated on the support 350 at a first articulation 354a and of which a second end is mounted articulated on the fitting 352 at a second articulation 354b.

Each pantograph hinge 302 also has an elbow 356 mounted articulated on the support 350 at a third articulation 356a and a second arm 358 of which a first end is mounted articulated on the elbow 356 at a fourth articulation 358a and of which a second end is mounted articulated on the fitting 352 at a fifth articulation 358b.

Each pantograph hinge 302 also has a connecting arm 360 of which a first end is fastened to the first arm 354 on the other side of the first articulation 354a with respect to the second articulation 354b and of which a second end is fastened to the elbow 356 on the other side of the third articulation 356a with respect to the fourth articulation 358a.

In the embodiment of the invention that is proposed here, the first and second arms 354 and 358 remain generally parallel between the open position and the closed position.

Each pantograph hinge 302 is generally inscribed in a plane perpendicular to the longitudinal axis X.

Each articulation 354a-b, 356a, 358a-b involved in each pantograph hinge 302 is a rotation about an axis of rotation parallel to the longitudinal axis X.

For two pantograph hinges 302 fastened to two different fan cowls 208a-b, the first arms 354 of the pantograph hinges 302 are disposed next to one another, and the second arms 358 of the pantograph hinges 302 are disposed opposite one another, i.e., the pantograph hinges 302 of one fan cowl 208a-b are symmetrical to the pantograph hinges 302 of the other fan cowl 208b-a with respect to the median plane XZ.

According to the particular embodiment described here, the fastening of each fan cowl 208a-b in the closed position is realized by the clamping screws 220 that constitute the locking means and that fasten said fan cowl 208*a-b* to the chassis 402. Such a fastening ensures control of the clearances between the fan cowl 208*a-b* and the surrounding cowls. The clamping screws 220 lock the fan cowl 208*a-b* on the chassis 402 in the closed position.

In the embodiment of the invention that is presented in FIG. 4, each fan cowl 208*a-b* has a skin 410 having an outer face oriented outwards and an inner face oriented opposite and a rigid structure 412 to which the outer skin 410 is fastened via its inner face. The pantograph hinges 302 are fastened to the rigid structure 412 by any suitable means such as welding, riveting, screwing, etc.

In the embodiment of the invention that is presented here, the rigid structure 412 is constituted of two arcuate reinforcements 412*a* and a plurality of longitudinal reinforcements 412*b*.

Each arcuate reinforcement 412*a* is in the form of an arc of a circle about the longitudinal axis X and there is one of them disposed at the front of the fan cowl 208*a-b* and one at the rear of the fan cowl 208*a-b* with respect to the longitudinal axis X.

The longitudinal reinforcements 412*b* extend parallel to the longitudinal axis X and are fastened to the arcuate reinforcements 412*a*.

In this embodiment, each pantograph hinge 302 is fastened to one of the arcuate reinforcements 412*a*.

In order to hold the fan cowl 208*a-b* in the open position when the locking means is in the unlocked position, the propulsion system 106 has, for each fan cowl 208*a-b*, at least one holding arm 307, of which a first end is fastened to the chassis 402 and of which a second end is fastened to the fan cowl 208*a-b*. The holding arm 307 is, for example, a telescopic arm that unfolds manually or hydraulically.

The invention has been more particularly described in the case in which the two fan cowls 208*a-b* are contiguous at 12 o'clock, but it is possible to provide for the two fan cowls 208*a-b* to be spaced apart from one another and for an intermediate cowl fastened to the chassis 402 to be interposed between them. The operation remains identical and makes it possible to move the fan cowl 208*a-b* away from the intermediate cowl.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion system for an aircraft, said propulsion system having a longitudinal axis and comprising:
    a chassis,
    a nacelle having two fan cowls,
    for each fan cowl, an articulation system fastened between the chassis and said fan cowl, so as to move said fan cowl between a closed position and an open position and between the closed position and the open position, and
    for each fan cowl, a locking means arranged to alternately adopt a locked position in which the locking means locks said fan cowl on the chassis in the closed position and an unlocked position in which the locking means does not lock said fan cowl on the chassis,
    wherein each articulation system has, for each fan cowl, two pantograph hinges,
    wherein each pantograph hinge comprises:
        a support fastened to the chassis,
        a fitting as one with the fan cowl,
        a first arm of which a first end is mounted articulated on the support at a first articulation and of which a second end is mounted articulated on the fitting at a second articulation,
        an elbow mounted articulated on the support at a third articulation and a second arm of which a first end is mounted articulated on the elbow at a fourth articulation and of which a second end is mounted articulated on the fitting at a fifth articulation, and
        a connecting arm of which a first end is fastened to the first arm on the other side of the first articulation with respect to the second articulation and of which a second end is fastened to the elbow on the other side of the third articulation with respect to the fourth articulation.

2. The propulsion system according to claim 1, wherein the chassis is constituted by a fan casing of the propulsion system.

3. The propulsion system according to claim 1, wherein each articulation is a rotation about an axis of rotation parallel to the longitudinal axis.

4. The propulsion system according to claim 1, wherein, for two pantograph hinges fastened to two different fan cowls, the first arms of the pantograph hinges are disposed next to one another, and the second arms of the pantograph hinges are disposed opposite one another.

5. The propulsion system according to claim 1, wherein the locking means is constituted by clamping screws that lock said fan cowl on the chassis in the closed position.

6. The propulsion system according to claim 1, wherein each fan cowl has a skin and a rigid structure to which the outer skin is fastened and in that the pantograph hinges are fastened to the rigid structure.

7. The propulsion system according to claim 1, further comprising, for each fan cowl, at least one holding arm, of which a first end is fastened to the chassis and of which a second end is fastened to the fan cowl.

8. An aircraft comprising:
    an engine and the propulsion system according to claim 1, wherein the engine is as one with the chassis and housed inside the nacelle.

* * * * *